United States Patent
Yang et al.

(10) Patent No.: US 10,979,233 B2
(45) Date of Patent: Apr. 13, 2021

(54) MONITORING TIME CERTIFICATE GENERATION REQUESTS

(71) Applicant: Advanced New Technologies Co., Ltd., Grand Cayman (KY)

(72) Inventors: Xinying Yang, Hangzhou (CN); Huabing Du, Hangzhou (CN); Benquan Yu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/812,211

(22) Filed: Mar. 6, 2020

(65) Prior Publication Data

US 2020/0213136 A1 Jul. 2, 2020

Related U.S. Application Data

(63) Continuation of application No. PCT/CN2020/070953, filed on Jan. 8, 2020.

(30) Foreign Application Priority Data

Apr. 4, 2019 (CN) .......................... 201910272452.8

(51) Int. Cl.
*H04L 29/06* (2006.01)
*H04L 9/32* (2006.01)
(Continued)

(52) U.S. Cl.
CPC ........ *H04L 9/3263* (2013.01); *G06F 16/2365* (2019.01); *G06F 16/28* (2019.01);
(Continued)

(58) Field of Classification Search
CPC ........ G06Q 40/00; G06Q 40/08; G06Q 40/12; H04L 2209/38; H04L 63/123; H04L 9/321
See application file for complete search history.

(56) References Cited

U.S. PATENT DOCUMENTS

| 2014/0222772 | A1 | 8/2014 | Peleg et al. |
| 2018/0176228 | A1* | 6/2018 | He .................. H04L 63/105 |

(Continued)

FOREIGN PATENT DOCUMENTS

| CN | 108280328 | 7/2018 |
| CN | 108540459 | 9/2018 |

(Continued)

OTHER PUBLICATIONS

Nimiq,"Verification" developer-reference https://nimiq-network.github.io/developer-reference/chapters/verify.html, Mar. 30, 2019, p. 1-7 (Year: 2019).*

(Continued)

*Primary Examiner* — Harunur Rashid
(74) *Attorney, Agent, or Firm* — Fish & Richardson P.C.

(57) ABSTRACT

Implementations of this specification provide for monitoring time certificate generation requests. An example method performed by a database service that stores data in a blockchain includes, in response to receiving a time certificate generation request, determining a starting block height H1 and an ending block height H2 of a target ledger of the blockchain corresponding to the time certificate generation request; in response to determining that the starting block H1 of the target ledger is greater than a block height H of time authenticated data blocks maintained by the database service, executing the time certificate generation request; and in response to receiving a time certificate generated by a time authentication service for the time certificate generation request, changing a value of the block height H of time authenticated data blocks maintained by the database service to the ending block height H2 of the target ledger.

15 Claims, 7 Drawing Sheets

(51) Int. Cl.
*G06F 16/28* (2019.01)
*G06F 16/23* (2019.01)
*H04L 9/06* (2006.01)

(52) U.S. Cl.
CPC .......... *H04L 9/0637* (2013.01); *H04L 9/3297* (2013.01); *H04L 63/0823* (2013.01); *H04L 2209/38* (2013.01)

(56) References Cited

U.S. PATENT DOCUMENTS

2018/0374173 A1* 12/2018 Chen ................. H04L 9/3236
2019/0394047 A1* 12/2019 Karame ............... H04L 63/14

FOREIGN PATENT DOCUMENTS

| CN | 108984744 | | 12/2018 |
|---|---|---|---|
| CN | 109120590 | | 1/2019 |
| CN | 109255713 | | 1/2019 |
| CN | 109508984 | | 3/2019 |
| CN | 110190963 | | 8/2019 |
| EP | 18186602.1 | * | 7/2018 |
| WO | WO 2018135766 | | 7/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report and Written Opinion in PCT Appln No. PCT/CN2020/070953, dated Apr. 9, 2020, 17 pages (with English translation).

* cited by examiner

MONITORING TIME CERTIFICATE GENERATION REQUESTS

CROSS-REFERENCE TO RELATED APPLICATIONS

This application is a continuation of PCT Application No. PCT/CN2020/070953, filed on Jan. 8, 2020, which claims priority to Chinese Patent Application No. 201910272452.8, filed on Apr. 4, 2019 and each application is hereby incorporated by reference in its entirety.

TECHNICAL FIELD

Implementations of the present specification relate to the field of information technologies, and in particular, to monitoring methods, devices, and equipment for time certificate generation requests.

BACKGROUND

A database service provider can store data records by using blocks in a form of block chaining ledger that stores data based on a blockchain data structure (e.g., in a form of a blockchain) in a centralized mode. In this case, a time certificate can be obtained and determined through a time authority to determine a generation time of a partial ledger, so as to prevent a user and a service party from jointly producing a forged ledger. In the process, timestamps in time certificates are increased monotonically, but partial data blocks corresponding to the time certificates might not be monotonically increased.

SUMMARY

An objective of implementations of the present specification is to provide monitoring solutions for time certificate generation requests, so as to generate more rigorous time certificates.

To alleviate the previous technical problem, the implementations of the present application are implemented as follows:

A monitoring method for a time certificate generation request is applied to a centralized database service provider that stores data by using multiple data blocks, including: when detecting a time certificate generation request, determining a starting block height H1 and an ending block height H2 of a target ledger corresponding to the current request; determining whether H1 is greater than a block height H of time authenticated data blocks maintained by the database service provider, and if H1>H, executing the current time certificate generation request, or otherwise, skipping executing the current time certificate generation request; and determining that a time certificate generated by a trusted time authentication institution for the current request has been received, and changing a value of the block height H to H2 of time authenticated data blocks, so as to determine whether a next time certificate generation request needs to be executed; where in the block chaining ledger, except an initial data block, each data block includes at least one data record and includes its own hash value that is determined by both the data record included in the data block and a hash value of a previous data block, and block heights of data blocks are increased monotonically based on a block generation time sequence.

Correspondingly, an implementation of the present specification further provides a monitoring device for a time certificate generation request, applied to a centralized database service provider that stores data by using multiple data blocks, including: a block height determining module, configured to, when a time certificate generation request is detected, determine a starting block height H1 and an ending block height H2 of a target ledger corresponding to the current request; a determination module, configured to determine whether H1 is greater than a block height H of time authenticated data blocks maintained by the database service provider, and if H1>H, execute the current time certificate generation request, or otherwise, skip executing the current time certificate generation request; and a value change module, configured to determine that a time certificate generated by a trusted time authority for the current request has been received, and change a value of the block height H to H2 of time authenticated data blocks, so as to determine whether a next time certificate generation request needs to be executed; where in the block chaining ledger, except an initial data block, each data block includes at least one data record and includes its own hash value that is determined by both the data record included in the data block and a hash value of a previous data block, and block heights of data blocks are increased monotonically based on a block generation time sequence.

According to the solutions provided in the implementations of the present specification, a database service provider maintains a block height H of time authenticated data blocks that is used to identify a data block and has passed time authentication. A value of the block height of time authenticated data blocks is changed to a maximum block height in current time authentication each time a time authority returns a time certificate. In addition, when time authentication is requested next time, a minimum block height should be greater than the block height of time authenticated data blocks. As such, it is ensured that block heights of ledgers corresponding to a series of generated time certificates are also monotonically increased (that is, a maximum block height in a previous ledger is less than a minimum block height in a next ledger), so as to manage and use ledgers more rigorously based on time certificates.

It should be understood that the previous general description and the following detailed description are merely examples and explanations, and cannot limit the implementations of the present specification.

In addition, there is no need for any implementation of the present specification to achieve full effects described above.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

Figure 1:
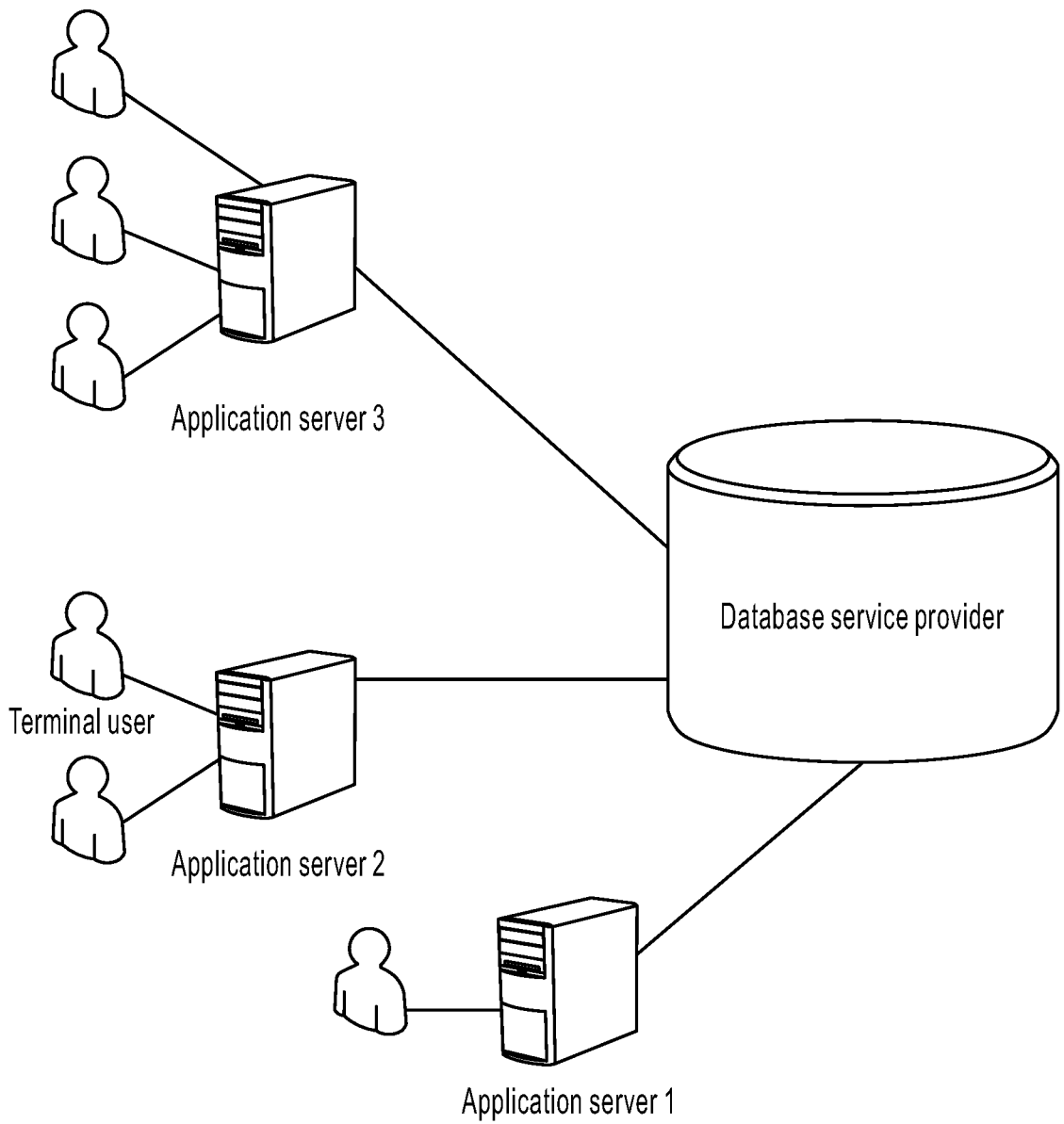
FIG. 1 is a schematic diagram illustrating a system architecture involved in the existing technology.

It should be understood that, in a current server architecture, a database server can directly interconnect to an individual client user; or some application servers can interconnect to individual client users, while a database server interconnects to the application servers, as shown in FIG. 1. FIG. 1 is a schematic diagram illustrating a system architecture involved in the existing technology.

Therefore, in the implementation of the present specification, when a user is an application server, a database service provider can be the database server shown in FIG. 1. When a user is an individual client user, the database service provider can also be a whole server end composed of an application server and a database server. Regardless of which case occurs, data is stored at the database service provider. Moreover, data operations (including adding, deleting, querying, etc.) are also performed at the database service provider based on user instructions. In other words, the database service provider in the present specification provides a data service in a centralized mode.

A data block can be generated in advance in the centralized database system in the implementation of the present specification in the following way:

A data record to be stored is received, and a hash value of each data record is determined. The data record to be stored can be various expense records of an individual client user, or can be a service result, an intermediate state, or an operation record, etc. that is generated when an application server executes service logic based on an instruction of the user. A specific service scenario can include an expense record, an audit log, a supply chain, a government supervision record, and a medical record, etc.

When a predetermined block generation condition is satisfied, each data record to be written into a data block is determined and the Nth data block that includes a hash value of the data block and the data record is generated.

The predetermined block generation condition includes the following: a quantity of data records to be stored reaches a quantity threshold, for example, one new data block is generated each time a quantity of received data records reaches 1000, and the 1000 data records are written into the block; or a time interval from a previous block generation moment reaches a time threshold, for example, one new data block is generated every 5 minutes, and data records received in the 5 minutes are written into the block.

N here refers to a sequence number of a data block. In other words, in the implementation of the present specification, the data blocks are arranged in a chained-block form in a block generation time sequence, and have a strong time sequence characteristic. Block heights of the data blocks are increased monotonically based on the block generation time sequence. A block height can be a sequence number. In this case, a block height of the Nth data block is N. The block height can also be generated by using another method.

When N=1, the data block is an initial data block. A hash value and a block height of the initial data block are given based on a predetermined method. For example, if the initial data block does not include a data record, the hash value is any given hash value, and the block height blknum is equal to 0. For another example, a trigger condition for generating the initial data block is the same as a trigger condition for another data block, but the hash value of the initial data block is determined by performing a hash operation on all content in the initial data block.

When N>1, because content and a hash value of a previous data block are already determined, a hash value of a current data block (the Nth data block) can be generated based on the hash value of the previous data block (that is, the (N−1)th data block). For example, in a feasible method, a hash value of each data record to be written into the Nth data block is determined, and a Merkle tree is generated based on a sequence of the data records in the block. Then, a root hash value of the Merkle tree is combined with the hash value of the previous data block to generate the hash value of the current block by using a hash algorithm again. In addition, the hash value of the current block can further be generated based on the root hash value of the Merkle tree and some other metadata (for example, a version number or a generation timestamp of the data block). For another example, combination can be performed based on a sequence of the data records in the block and a hash operation can be performed to obtain a hash value of the overall data records. Then, the hash value of the previous data block is combined with the hash value of the overall data records, and a hash operation is performed on a string obtained through the combination to generate the hash value of the data block.

In the preceding data block generation method, each data block can be determined by using a hash value, and the hash value of the data block can be determined by content and a sequence of data records in the data block and the hash value of the previous data block. A user can initiate verification at any time based on a hash value of a data block or a hash value of a data record. Modification to any content in the data block (including modification to content or a sequence of data records in the data block) causes inconsistency between a hash value of the data block that is calculated during verification and a hash value obtained when the data block is generated. Consequently, the verification fails and tamper-resistance can be implemented in the centralized mode.

Figure 2:
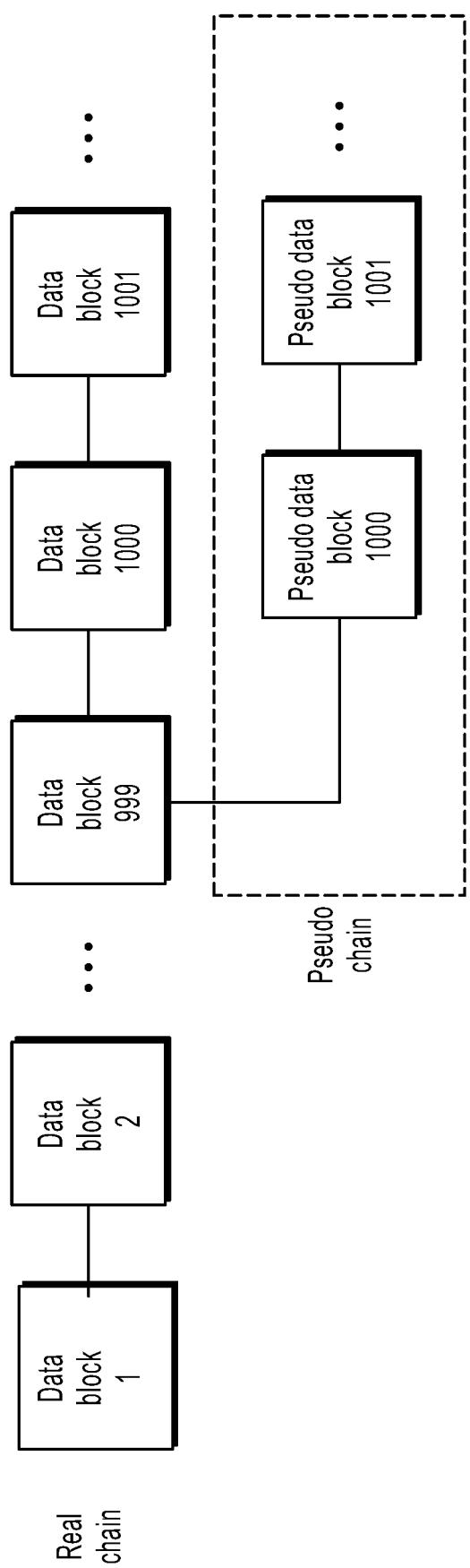
FIG. 2 is a schematic diagram illustrating a pseudo chain, according to an implementation of the present specification.

In the preceding method, it is still possible that a user and a service party jointly forge some data blocks to generate a related pseudo chain, so that a new ledger that is partially the same as an original ledger can be formed to avoid related audit and verification. As shown in FIG. 2, FIG. 2 is a schematic diagram illustrating a pseudo chain, according to an implementation of the present specification. A data block generation method in a process of generating the pseudo chain is the same as the preceding block generation method.

In the schematic diagram, after the ledger has recorded many data blocks, if the service party considers that a data record in the 1000th data block has a problem, the service party may cooperate with the database service provider to generate another data block as the 1000th data block, append the data block behind the 999th data block, and replace data blocks starting from the 1000th data block, so that a pseudo chain partially the same as the original ledger is formed and the preceding problem can be hidden from verification and audit. A third party cannot distinguish between a pseudo chain and a real chain.

Figure 3:
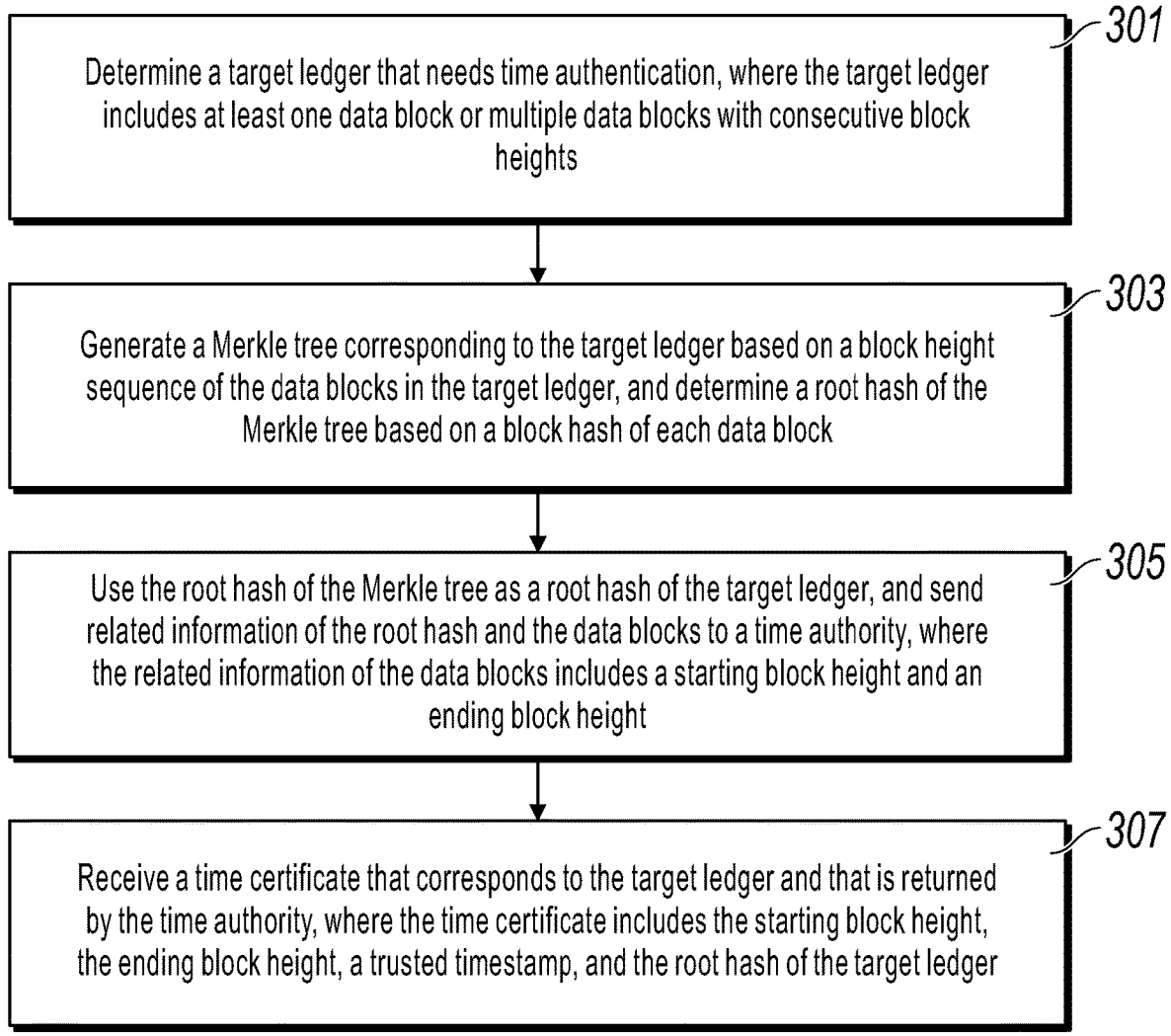
FIG. 3 is a schematic flowchart illustrating time certificate generation, according to an implementation of the present specification.

Therefore, time authentication can further be performed on a ledger in an implementation of the present specification. As shown in FIG. 3, FIG. 3 is a schematic flowchart illustrating time certificate generation, according to an implementation of the present specification. The following steps are included.

301: Determine a target ledger that needs time authentication, where the target ledger includes at least one data block or multiple data blocks with consecutive block heights.

As described above, in the block chaining ledger, except an initial data block, each data block includes at least one data record and includes its own hash value that is determined by both the data record included in the data block and a hash value of a previous data block, and block heights of data blocks are increased monotonically based on a block generation time sequence.

Specifically, a service provider first determines, from data blocks that have been generated and stored, a segment of ledger that needs time authentication. The ledger should include at least one data block or multiple data blocks with consecutive block heights. A determining method can be specified based on a user operation. For example, a user initiates a time authentication instruction, and the instruction includes a starting block height and a block quantity that are needed for the time authentication. The partial ledger is used as a target ledger.

The target ledger can also be automatically specified by the service provider based on predetermined service logic, instead of being specified by a user. For example, in terms of the finest granularity, time authentication application is available for each data block. In such a method, a root hash of a Merkle tree of a partial ledger is a block hash value of the data block. The method can ensure authenticity of a ledger (namely, each data block) to the maximum extent. The method causes relatively high cost overheads for both a time authentication center and the service provider due to a high data block generation frequency.

In an optional method, a specific predetermined time authentication condition is set, and when the predetermined time authentication condition is satisfied, a time authentication request is initiated. When newly generated data blocks are all considered as data blocks that are about to undergo time authentication, the predetermined time authentication condition can be as follows: A quantity of data blocks that are about to undergo time authentication reaches a quantity threshold, or a time interval from previous time authentication reaches a time threshold.

303: A Merkle tree corresponding to the target ledger is generated based on a block height sequence of the data blocks in the target ledger, and a root hash of the Merkle tree is determined based on a block hash of each data block.

Due to dependency of chained data blocks in the ledger, the Merkle tree here only needs to be generated based on a sequence of the data blocks. A conventional calculation method is used as a specific root hash calculation method, and details are omitted here for simplicity.

305: Use the root hash of the Merkle tree as a root hash of the target ledger, and send related information of the root hash and the data blocks to a time authority, where the related information of the data blocks includes a starting block height and an ending block height.

Figure 8:
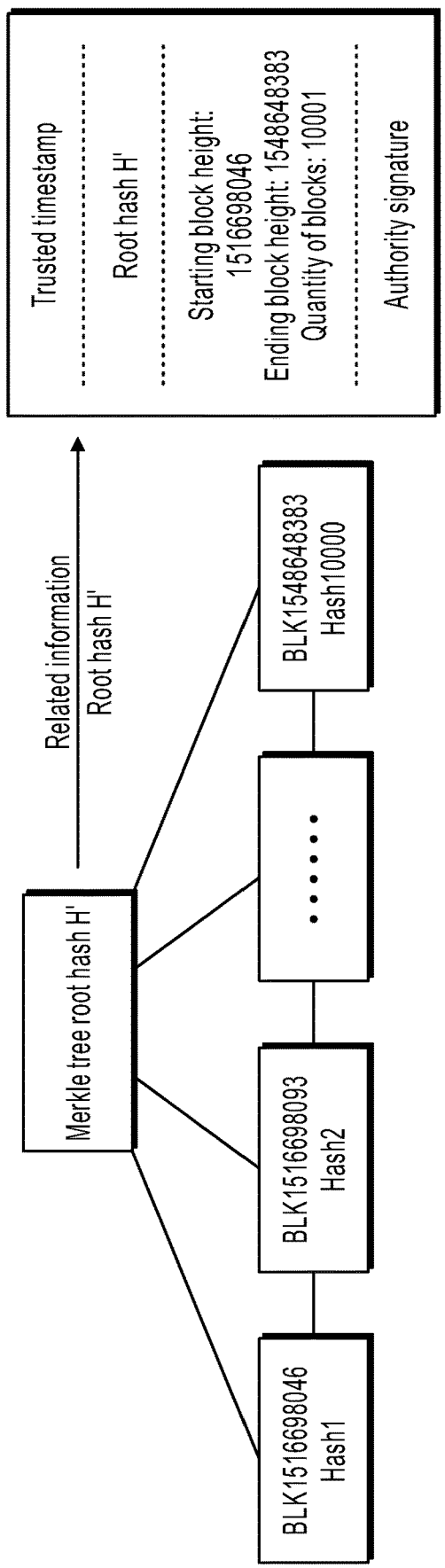
FIG. 8 is a schematic structural diagram illustrating a time certificate, according to an implementation of the present specification.

For example, the time authority can be the National Time Service Center or a corresponding time authentication institution authorized by the National Time Service Center. The time authority provides a trusted timestamp upon receiving the preceding information, and performs digital signature authentication on the trusted timestamp to generate a time certificate that includes the trusted timestamp and a digital signature. The time certificate can further include related information of the preceding data blocks, and a digital signature method can be conventional private key-based encryption and public key-based decryption. As shown in FIG. 8, FIG. 8 is a schematic structural diagram illustrating a time certificate, according to an implementation of the present specification.

307: Receive a time certificate that corresponds to the target ledger and that is returned by the time authority, where the time certificate includes the starting block height, the ending block height, a trusted timestamp, and the root hash of the target ledger.

Therefore, the database service provider can receive a series of trusted time certificates that each include a signature of the time authority, and each time certificate includes a trusted timestamp and corresponds to a segment of ledger. The time certificate can prove that the partial ledger corresponding to the time certificate is generated before the trusted timestamp. A specific partial ledger can be clarified by using related information in the time certificate. The database service provider can correspondingly manage and verify the series of time certificates. For example, the database service provider can sequentially number each time certificate. A time certificate-related database or index can be established. The database or the index includes a mapping table between a time certificate number and a root hash value of a partial ledger corresponding to a starting data block height, an ending data block height, and a time certificate.

S301 to S305 in the preceding time certificate generation process can be considered as a part of a time certificate generation request. The time certificate generation request includes the root hash of the target ledger and the related information of the data blocks.

Figure 4:
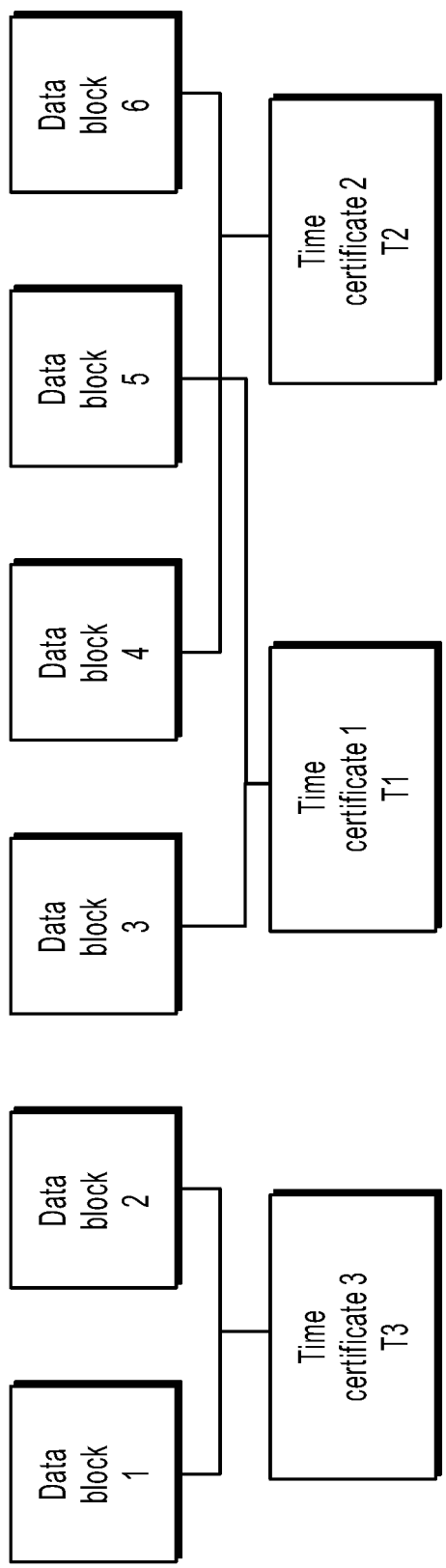
FIG. 4 is a schematic diagram illustrating a mapping between a time certificate and a ledger, according to an implementation of the present specification.

In the preceding time certificate generation process, a ledger corresponding to a time certificate can be specified by a user or determined based on specific service logic. A trusted timestamp in the time certificate is given by the time authority. Therefore, the following case is likely to happen: Trusted timestamps in time certificates are monotonically increased, but block heights of partial ledgers corresponding to the time certificates are not monotonically increased and may partially overlap or affected by lagging. As shown in FIG. 4, FIG. 4 is a schematic diagram illustrating a mapping between a time certificate and a ledger, according to an implementation of the present specification.

In the schematic diagram, time certificate 1, time certificate 2, and time certificate 3 are sequentially generated. Therefore, trusted timestamps T1, T2, and T3 are also sequentially arranged. However, ledgers corresponding to the time certificates that are partially overlap or lagged behind due to a cause such as a user instruction or a latency caused by network failures.

In the implementation of the present specification, a time certificate based on time authentication of a time authority can be used as a proof for ledger verification. A dependency exists between previous and next data blocks during block chaining ledger verification. Therefore, when timestamps of time certificates are increased monotonically but corresponding ledgers are not, efficiency and accuracy of ledger verification are reduced, and inconvenience is brought to ledger management.

Figure 5:
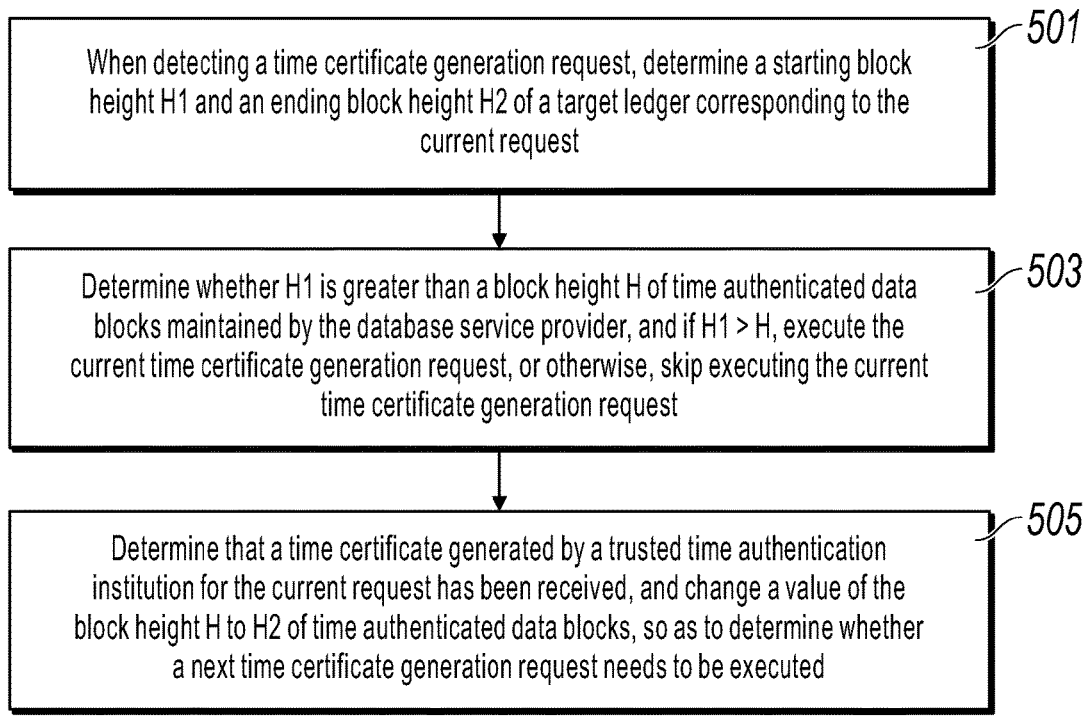
FIG. 5 is a schematic flowchart illustrating a monitoring method for a time certificate generation request, according to an implementation of the present specification.

Based on this, an implementation of the present specification further provides a monitoring method for a time certificate generation request, applied to a centralized database service provider that stores data by using multiple data blocks. As shown in FIG. 5, FIG. 5 is a schematic flowchart illustrating a monitoring method for a time certificate generation request, according to an implementation of the present specification. The method includes the following steps.

501: When detecting a time certificate generation request, determine a starting block height H1 and an ending block height H2 of a target ledger corresponding to the current request.

As described above, the time certificate request can be determined based on an instruction of a user. For example, if the user specifies to perform time authentication on the first 10000 data blocks, H1=1 and H2=1000. Correspondingly, the user can further determine the starting block height and the ending block height in the target ledger by using an operation instruction. For example, if the user inputs a time authentication instruction TIME ID:(1000,1999), H1=1000 and H2=1999.

503: Determine whether H1 is greater than a block height H of time authenticated data blocks maintained by the database service provider, and if H1>H, execute the current time certificate generation request, or otherwise, skip executing the current time certificate generation request.

The initial block height H of time authenticated data blocks can be set to 0. That is, no time certificate has ever been generated for the ledger at this time. In other words, during the first time authentication, an initial block height greater than 0 can be randomly specified to implement time authentication. Generally, to ensure time authentication on full data blocks in the ledger, the starting block height H1 can be set to 1.

In any subsequent time authentication process, it needs to be determined whether the current starting block height H1 is greater than H. Generally, if time authentication does not need to be performed on a full ledger, H1 only needs to be greater than H.

If time authentication needs to be performed on a full ledger, consecutiveness between H1 and H further needs to be maintained. When a block height is a natural number, H1 needs to be equal to H+1. When the block height is a large integer obtained through conversion based on a block generation time, there should be no other block height between H1 and H.

505: Determine that a time certificate generated by a trusted time authentication institution for the current request has been received, and change a value of the block height H to H2 of time authenticated data blocks, so as to determine whether a next time certificate generation request needs to be executed.

In other words, the value of the block height H of time authenticated data blocks is a dynamic value that constantly increases with generation of time certificates. It indicates that a ledger previous to the block height H of time authenticated data blocks has fully or partially passed time authentication, and the ledger passing authentication can be given by a series of generated time certificates. In this case, if a new time certificate needs to be generated, a minimum block height of a ledger to be time authenticated should be greater than the block height H of time authenticated data blocks. With such a method, it can be ensured that a time certificate with an earlier trusted timestamp corresponds to an earlier partial ledger, and partial ledgers corresponding to various time certificates do no overlap.

In addition, before it is determined that the time certificate has been received, public key-based decryption can further be used to decrypt and check a time authority digital signature included in the time certificate.

According to the solution provided in the implementation of the present specification, a database service provider maintains a block height H of time authenticated data blocks that is used to identify a data block that has passed time authentication. A value of the block height of time authenticated data blocks is changed to a maximum block height in current time authentication each time a time authority returns a time certificate. In addition, when time authentication is requested next time, a minimum block height must be greater than the block height of time authenticated data blocks. As such, it is ensured that block heights of ledgers corresponding to time certificates are also monotonically increased (that is, a maximum block height in a previous ledger is less than a minimum block height in a next ledger), so as to manage and use ledgers more rigorously based on time certificates.

Figure 6:
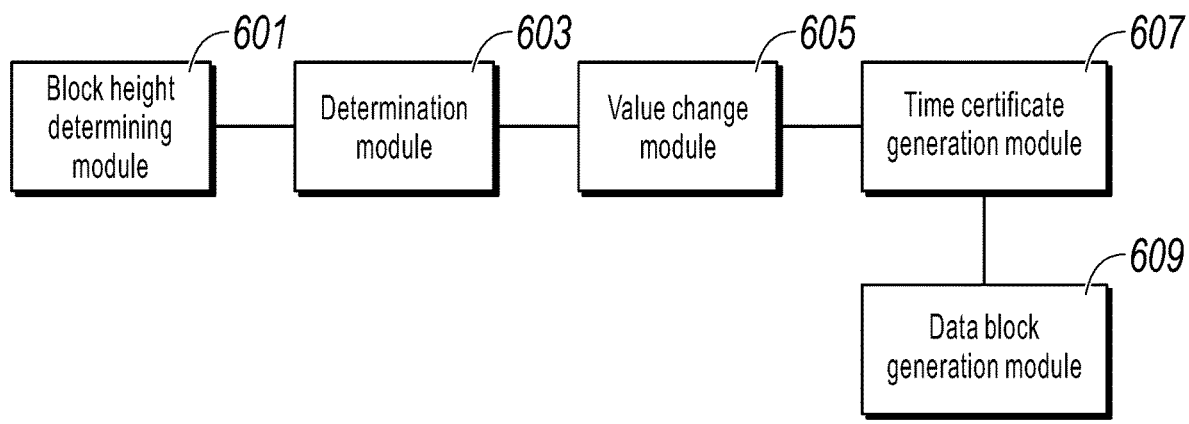
FIG. 6 is a schematic structural diagram illustrating a monitoring device for a time certificate generation request in a block chaining ledger, according to an implementation of the present specification.

Correspondingly, an implementation of the present specification further provides a monitoring device for a time certificate generation request. As shown in FIG. 6, FIG. 6 is a schematic structural diagram illustrating a monitoring device for a time certificate generation request in a block chaining ledger, according to an implementation of the present specification. The device includes the following: a block height determining module 601, configured to, when a time certificate generation request is detected, determine a starting block height H1 and an ending block height H2 of a target ledger corresponding to the current request; a determination module 603, configured to determine whether H1 is greater than a block height H of time authenticated data blocks maintained by the database service provider, and if H1>H, execute the current time certificate generation request, or otherwise, skip executing the current time certificate generation request; and a value change module 605, configured to determine that a time certificate generated by a trusted time authentication institution for the current request has been received, and change a value of the block height H to H2 of time authenticated data blocks, so as to determine whether a next time certificate generation request needs to be executed; where in the block chaining ledger, except an initial data block, each data block includes at least one data record and includes its own hash value that is determined by both the data record included in the data block and a hash value of a previous data block, and block heights of data blocks are incremented monotonically based on a block generation time sequence.

Further, the device further includes a time certificate generation module 607, configured to determine a target ledger that needs time authentication, where the target ledger includes at least one data block or multiple data blocks with consecutive block heights; generate a Merkle tree corresponding to the target ledger based on a block height sequence of the data blocks in the target ledger, and determine a root hash of the Merkle tree based on a block hash of each data block; send the root hash of the Merkle tree and related information of the data blocks to a time authority, where the related information of the data blocks includes the starting block height H1, the ending block height H2, or a quantity of the data blocks; and receiving a time certificate that is returned by the time authority, corresponds to the target ledger, and includes a trusted timestamp and a time authority signature, where the time certificate includes the root hash of the Merkle tree and the related information of the data blocks.

Further, the device further includes a data block generation module 609, configured to receive a data record to be stored, and determine a hash value of each data record; and when a predetermined block generation condition is satisfied, determine each data record to be written into a data block and generate the Nth data block that includes a hash value of the data block and the data record, specifically including: when N=1, giving a hash value and a block height of the initial data block based on a predetermined method; and when N>1, determining the hash value of the Nth data block based on each data record to be written into the data block and a hash value of the (N−1)th data block, and generating the Nth data block that includes the hash value of the Nth data block, each data record, and a block generation time of the data block, where block heights of data blocks are incremented monotonically based on a block generation time sequence.

Further, in the device, the predetermined block generation condition includes: a quantity of data records to be stored reaches a quantity threshold; or a time interval from a previous block generation moment reaches a time threshold.

Further, the time certificate generation module 609 determines each new data block as a target ledger; or determines, based on a starting block height and an ending block height that are determined by an instruction of a user, the target ledger that needs time authentication.

Further, the time certificate generation module 609 uses a newly generated ledger compliant with a predetermined time authentication condition as the target ledger, where the time authentication condition includes: a quantity of newly generated data blocks reaches a quantity threshold; or a time interval from previous time authentication reaches a time threshold.

An implementation of the present specification further provides computer equipment. The computer equipment includes at least a memory, a processor, and a computer program that is stored in the memory and that can run on the processor. When executing the program, the processor performs the monitoring method for a time certificate generation request shown in FIG. 5.

Figure 7:
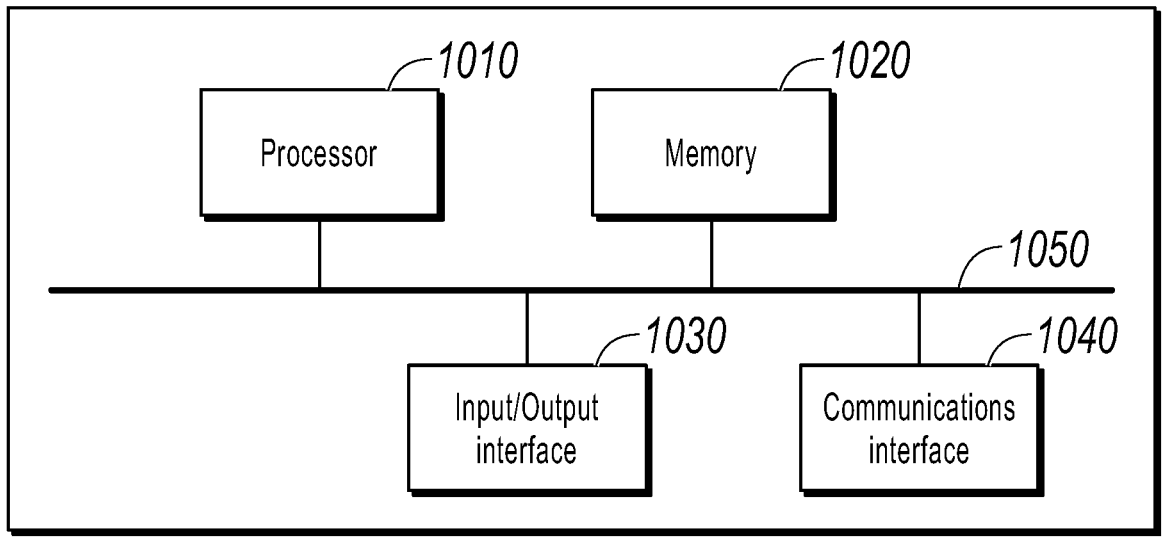
FIG. 7 is a schematic structural diagram illustrating equipment for configuring a method in an implementation of the present specification.

FIG. 7 is a more detailed schematic structural diagram illustrating a hardware structure of computing equipment, according to an implementation of the present specification. The equipment can include a processor 1010, a memory 1020, an input/output interface 1030, a communications interface 1040, and a bus 1050. The processor 1010, the memory 1020, the input/output interface 1030, and the communications interface 1040 are connected to and communicate with each other inside the equipment by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), static storage equipment, dynamic storage equipment, etc. The memory 1020 can store an operating system and another application program. When the technical solutions provided in the implementations of the present specification are implemented by using software or firmware, related program code is stored in the memory 1020, and is called and executed by the processor 1010.

The input/output interface 1030 is configured to connect to an input/output module, to input or output information. The input/output module (not shown in the figure) can be used as a component and configured in the equipment, or can be externally connected to the equipment, to provide a corresponding function. The input equipment can include a keyboard, a mouse, a touchscreen, a microphone, various sensors, etc. The output equipment can include a display, a speaker, a vibrator, an indicator, etc.

The communications interface 1040 is configured to connect to a communications module (not shown in the figure), to implement communication interaction between the equipment and other equipment. The communications module can perform communication by using a wired (for example, USB or a network cable) or wireless (for example, a mobile network, Wi-Fi, or Bluetooth) method.

The bus 1050 includes one channel, used to transmit information between components (for example, the processor 1010, the memory 1020, the input/output interface 1030, and the communications interface 1040) of the equipment.

It should be understood that, although only the processor 1010, the memory 1020, the input/output interface 1030, the communications interface 1040, and the bus 1050 of the equipment are shown, during specific implementation, the equipment can further include other components necessary for normal running. In addition, a person skilled in the art can understand that the equipment can include only components necessary for implementing the solutions in the implementations of the present specification, but does not necessarily include all components shown in the figure.

An implementation of the present specification further provides a computer readable storage medium. The computer readable storage medium stores a computer program, and when executed by a processor, the program can implement the monitoring method for a time certificate generation request shown in FIG. 5.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or other magnetic storage equipment or any other non-transmission medium. The computer storage medium can be configured to store information that can be accessed by computing equipment. As described in the present specification, the computer readable medium does not include computer readable transitory media (transitory media) such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing computer equipment (which can be a personal computer, a server, network equipment, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. Typical implementation equipment is a computer, and the computer can be a personal computer, a laptop computer, a cellular phone, a camera phone, a smartphone, a personal digital assistant, a media player, navigation equipment, an email receiving and sending equipment, a game console, a tablet computer, wearable equipment, or any combination of the equipment above.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described device implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present specification. It should be noted that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method, comprising:
   in response to receiving a time certificate generation request, determining, by a database service that stores data in a blockchain, a starting block height H1 and an ending block height H2 of a target ledger of the blockchain corresponding to the time certificate generation request, wherein the target ledger comprises at least one data block or multiple data blocks with consecutive block heights;
   in response to determining, by the database service, that the starting block height H1 of the target ledger is greater than a block height H of time authenticated data blocks maintained by the database service, requesting, by the database service and from a time authentication service, a time certificate that corresponds to the target ledger, wherein requesting the time certificate comprises:
      generating a Merkle tree corresponding to the target ledger based on a block height sequence of the data blocks in the target ledger;
      determining a root hash of the Merkle tree based on a block hash of each data block; and
      sending, to the time authentication service, the root hash of the Merkle tree and related information of the data blocks, wherein the related information of the data blocks comprises the starting block height H1 and the ending block height H2, or a quantity of the data blocks;
   receiving, by the database service and from the time authentication service, the time certificate that corresponds to the target ledger, wherein the time certificate comprises the root hash of the Merkle tree, the related information of the data blocks, a trusted timestamp, and a time authority signature; and
   in response to receiving, by the database service, the time certificate from the time authentication service for the time certificate generation request, changing a value of the block height H of time authenticated data blocks maintained by the database service to the ending block height H2 of the target ledger, wherein block heights of data blocks in the target ledger are increased monotonically based on a block generation time sequence.

2. The computer-implemented method of claim 1, further comprising:
   receiving, by the database service, one or more data records to be stored;
   for each of the one or more data records, determining, by the database service, a corresponding hash value; and
   in response to a predetermined block generation condition being satisfied, determining each data record to be written into a data block and generating an Nth data block that comprises a hash value of the data block and the data record.

3. The computer-implemented method of claim 2, wherein the predetermined block generation condition comprises:
   a quantity of data records to be stored reaching a quantity threshold; or
   a time interval from a previous block generation operation reaching a time threshold.

4. The computer-implemented method of claim 1, wherein determining the target ledger for which time authentication is to be performed comprises:
   determining a new data block as being the target ledger; or
   determining, based on a starting block height and an ending block height that are indicated by user initiated instruction, the target ledger.

5. The computer-implemented method of claim 1, wherein determining the target ledger for which time authentication is to be performed comprises:

using a newly generated ledger compliant with a predetermined time authentication condition as the target ledger, wherein the predetermined time authentication condition comprises:
  a quantity of newly generated data blocks reaching a quantity threshold; or
  a time interval from a previous time authentication operation reaching a time threshold.

6. A non-transitory, computer-readable medium storing one or more instructions executable by a computer system to perform operations comprising:
  in response to receiving a time certificate generation request, determining, by a database service that stores data in a blockchain, a starting block height H1 and an ending block height H2 of a target ledger of the blockchain corresponding to the time certificate generation request wherein the target ledger comprises at least one data block or multiple data blocks with consecutive block heights;
  in response to determining, by the database service, that the starting block height H1 of the target ledger is greater than a block height H of time authenticated data blocks maintained by the database service, requesting, by the database service and from a time authentication service, a time certificate that corresponds to the target ledger, wherein requesting the time certificate comprises:
    generating a Merkle tree corresponding to the target ledger based on a block height sequence of the data blocks in the target ledger;
    determining a root hash of the Merkle tree based on a block hash of each data block; and
    sending, to the time authentication service, the root hash of the Merkle tree and related information of the data blocks, wherein the related information of the data blocks comprises the starting block height H1 and the ending block height H2, or a quantity of the data blocks;
  receiving, by the database service and from the time authentication service, the time certificate that corresponds to the target ledger, wherein the time certificate comprises the root hash of the Merkle tree, the related information of the data blocks, a trusted timestamp, and a time authority signature; and
  in response to receiving, by the database service, the time certificate from the time authentication service for the time certificate generation request, changing a value of the block height H of time authenticated data blocks maintained by the database service to the ending block height H2 of the target ledger, wherein block heights of data blocks in the target ledger are increased monotonically based on a block generation time sequence.

7. The computer-readable medium of claim 6, the operations further comprising:
  receiving, by the database service, one or more data records to be stored;
  for each of the one or more data records, determining, by the database service, a corresponding hash value; and
  in response to a predetermined block generation condition being satisfied, determining each data record to be written into a data block and generating an Nth data block that comprises a hash value of the data block and the data record.

8. The computer-readable medium of claim 7, wherein the predetermined block generation condition comprises:
  a quantity of data records to be stored reaching a quantity threshold; or
  a time interval from a previous block generation operation reaching a time threshold.

9. The computer-readable medium of claim 6, wherein determining the target ledger for which time authentication is to be performed comprises:
  determining a new data block as being the target ledger; or
  determining, based on a starting block height and an ending block height that are indicated by user initiated instruction, the target ledger.

10. The computer-readable medium of claim 6, wherein determining the target ledger for which time authentication is to be performed comprises:
  using a newly generated ledger compliant with a predetermined time authentication condition as the target ledger, wherein the predetermined time authentication condition comprises:
    a quantity of newly generated data blocks reaching a quantity threshold; or
    a time interval from a previous time authentication operation reaching a time threshold.

11. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    in response to receiving a time certificate generation request, determining, by a database service that stores data in a blockchain, a starting block height H1 and an ending block height H2 of a target ledger of the blockchain corresponding to the time certificate generation request wherein the target ledger comprises at least one data block or multiple data blocks with consecutive block heights;
    in response to determining, by the database service, that the starting block height H1 of the target ledger is greater than a block height H of time authenticated data blocks maintained by the database service, requesting, by the database service and from a time authentication service, a time certificate that corresponds to the target ledger, wherein requesting the time certificate comprises:
      generating a Merkle tree corresponding to the target ledger based on a block height sequence of the data blocks in the target ledger;
      determining a root hash of the Merkle tree based on a block hash of each data block; and
      sending, to the time authentication service, the root hash of the Merkle tree and related information of the data blocks, wherein the related information of the data blocks comprises the starting block height H1 and the ending block height H2, or a quantity of the data blocks;
    receiving, by the database service and from the time authentication service, the time certificate that corresponds to the target ledger, wherein the time certificate comprises the root hash of the Merkle tree, the related information of the data blocks, a trusted timestamp, and a time authority signature; and
    in response to receiving, by the database service, the time certificate from the time authentication service for the time certificate generation request, changing a value of the block height H of time authenticated data blocks maintained by the database service to the ending block height H2 of the target ledger, wherein block heights of data blocks in the target ledger are increased monotonically based on a block generation time sequence.

12. The computer-implemented system of claim 11, the operations further comprising:
   receiving, by the database service, one or more data records to be stored;
   for each of the one or more data records, determining, by the database service, a corresponding hash value; and
   in response to a predetermined block generation condition being satisfied, determining each data record to be written into a data block and generating an Nth data block that comprises a hash value of the data block and the data record.

13. The computer-implemented system of claim 12, wherein the predetermined block generation condition comprises:
   a quantity of data records to be stored reaching a quantity threshold; or
   a time interval from a previous block generation operation reaching a time threshold.

14. The computer-implemented system of claim 11, wherein determining the target ledger for which time authentication is to be performed comprises:
   determining a new data block as being the target ledger; or
   determining, based on a starting block height and an ending block height that are indicated by user initiated instruction, the target ledger.

15. The computer-implemented system of claim 11, wherein determining the target ledger for which time authentication is to be performed comprises:
   using a newly generated ledger compliant with a predetermined time authentication condition as the target ledger, wherein the predetermined time authentication condition comprises:
       a quantity of newly generated data blocks reaching a quantity threshold; or
       a time interval from a previous time authentication operation reaching a time threshold.

* * * * *

UNITED STATES PATENT AND TRADEMARK OFFICE
CERTIFICATE OF CORRECTION

PATENT NO. : 10,979,233 B2
APPLICATION NO. : 16/812211
DATED : April 13, 2021
INVENTOR(S) : Xinying Yang, Huabing Du and Benquan Yu Page 1 of 1

It is certified that error appears in the above-identified patent and that said Letters Patent is hereby corrected as shown below:

In the Claims

Column 13, Line 17, in Claim 6, delete "request" and insert -- request, --, therefor.

Column 14, Line 35, in Claim 11, delete "request" and insert -- request, --, therefor.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*